Aug. 14, 1945.  L. R. SIMMONS  2,382,449
HAULING UNIT
Original Filed April 2, 1940  3 Sheets-Sheet 1
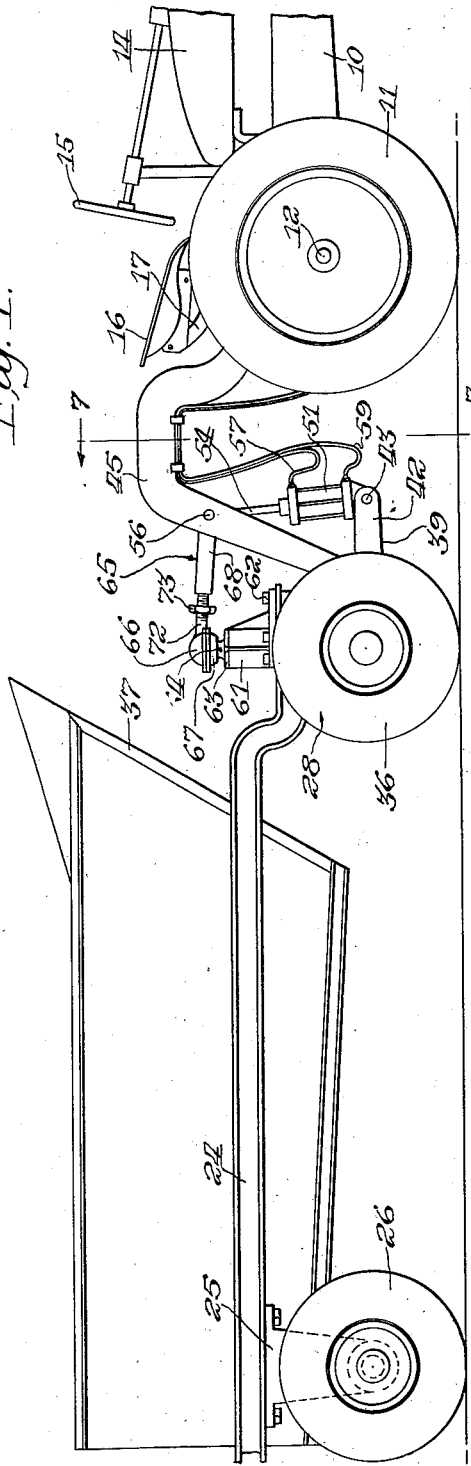
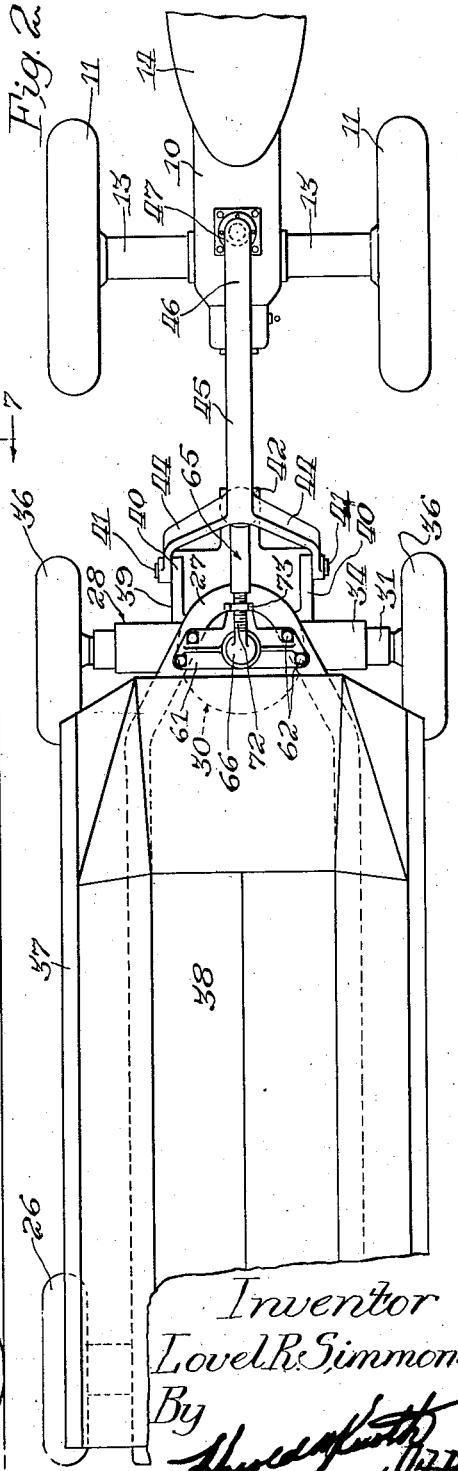
Inventor
Lovel R. Simmons Aug. 14, 1945.  L. R. SIMMONS  2,382,449
HAULING UNIT
Original Filed April 2, 1940  3 Sheets-Sheet 2

Inventor
Lovel R. Simmons
By
Atty.

Aug. 14, 1945.  L. R. SIMMONS  2,382,449
HAULING UNIT
Original Filed April 2, 1940   3 Sheets-Sheet 3
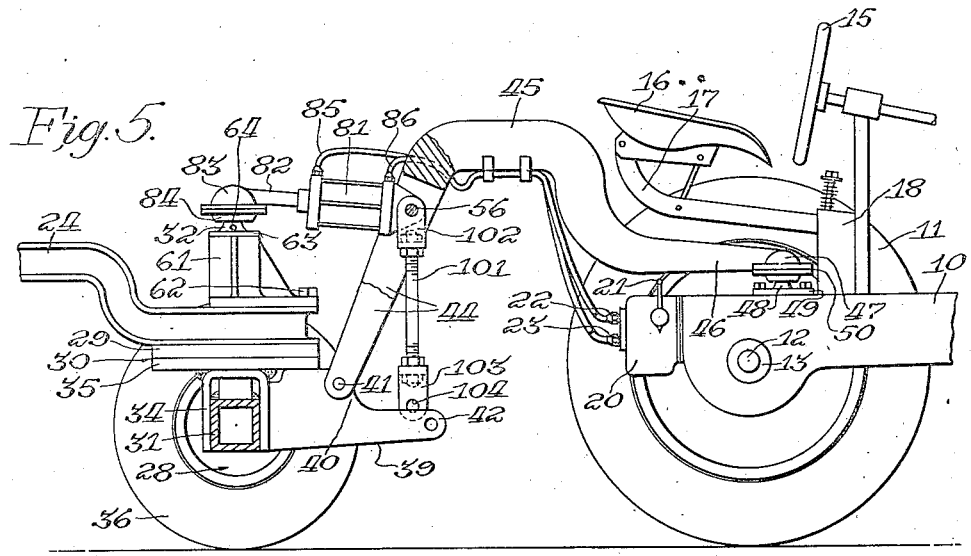
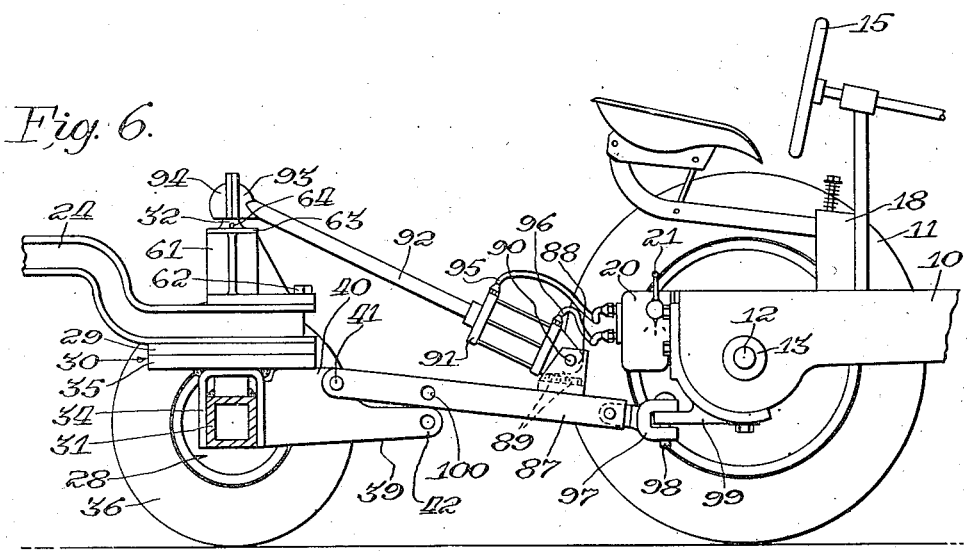
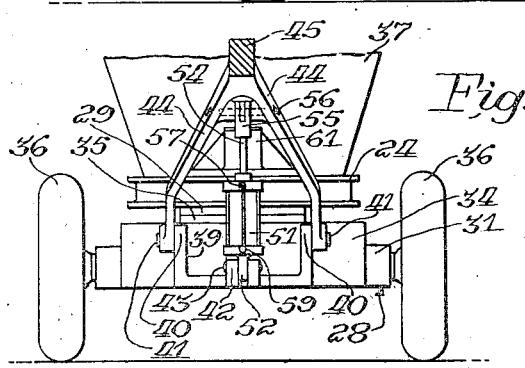
Inventor
Lovel R. Simmons Patented Aug. 14, 1945

2,382,449

UNITED STATES PATENT OFFICE 2,382,449

HAULING UNIT

Lovel Reynolds Simmons, Jackson, Miss.

Continuation of application Serial No. 327,446, April 2, 1940. This application October 3, 1941, Serial No. 413,550

34 Claims. (Cl. 280—33.44)

GENERAL STATEMENT OF THE INVENTION

This invention relates to a hauling unit and draft appliances therefor, and more particularly to novel draft connections to be utilized between a propelling vehicle and a load-carrying vehicle.

The invention contemplates and has for its principal object an improved draft connection for use in conjunction with tractors or trucks and trailers wherein the vehicles are operated in localities having varying road conditions. The invention is particularly useful in conjunction with vehicles employed in road building operations wherein the tractor and trailing vehicle are at various times operated over hard-surfaced roads and at other times over excavated or unpaved terrain, or over level stretches and then over terrain marked by slopes and cuts; or, under any conditions wherein varying surface contour and facing present correspondingly varying load and traction problems. One usual unit employed under such circumstances consists of a propelling vehicle in the form of a tractor or truck and a load-carrying vehicle in the form of the ordinary trailer of the four-wheeled type wherein there is employed the usual draft connection consisting merely of a draw-bar element between the tractor and trailer. The arrangement of the unit is satisfactory when the unit is operated over hard-surfaced roads or under other conditions where the tractor is able to obtain sufficient traction. However, when the unit must be operated over excavated or unpaved ground, or over slopes and cuts, the tractor cannot obtain sufficient traction and the unit becomes stalled or mired in soft soil. Previously, means for overcoming the lack of traction have included the provision of wheel weights for the tractor. While such wheel weights have contributed materially to increasing the traction of the tractor during operation over soft soil, said weights militate against efficient operation of the unit on hard-surfaced roads, since the combined weight of the unit is materially increased, and the extra weight is unnecessary. If the wheel weights are omitted, the difficulties previously mentioned are experienced; the time and labor involved in changing the weights to meet immediate circumstances are prohibitive.

Another unit often employed is the tractor and semi-trailer. The use of this unit is accompanied with generally similar problems. In view of the fact that in a semi-trailer unit the tractor must carry the forward portion of the loaded trailer, it becomes necessary to provide a specially designed and expensively equipped tractor, having costly structural characteristics to enable it to carry the superimposed load of the trailer; also, the tractor must be equipped with dual, heavy duty tires. A particular disadvantage of the "semi" unit is the length of the wheelbase between the rear tractor wheels and the trailer wheels. The extreme distance between the points of support for the trailer causes the trailer to "surge" forwardly on the tractor, especially at higher speeds or down slopes, with a resultant quick destruction of the rear structure and drive mechanism of the tractor and a consequent short life of the tractor as a whole. Further, vibration of the loaded trailer is reflected in pounding on the rear part of the tractor. It is to be understood that the expression "tractor and trailer unit" includes all vehicular units, such as trailers, scrapers, graders, excavators, and like vehicles, as may be pushed or pulled, or otherwise propelled, by a tractor or other draft or power vehicle.

STATEMENT OF THE OBJECTS OF THE INVENTION

The principal object of the present invention is to eliminate the difficulties described above, by the provision of means for temporarily transferring the weight of the forward portion of the trailer to the tractor as required, whereby the loaded trailer is normally self-supported but wherein part of the load of the trailer may be temporarily transferred to the tractor to enable the tractor to obtain better traction.

Another object is to provide means in the form of mechanism between the vehicles that will impart pressure from one to the other, this means being connected directly to the tractor or indirectly to the tractor through draft means or other structure.

Another object is to provide means by which the rear end of the draft vehicle may be raised with respect to the front of the trailing vehicle, and, more particularly, to provide for the achievement of this result by the same means that serves to exert downward pressure on the draft vehicle from the trailing vehicle.

An important object is to provide lockable and releasable means so that the temporarily transferred weight may be either retained to convert a tractor and four-wheeled trailer to a semi-trailer unit or be re-transferred to the trailer wheels when the unit is operated under other conditions where both speed and traction are readily obtained.

Another object is to provide means for locking the front wheels of the trailer against steering while the unit is temporarily converted to a semi-trailer unit.

It is an object of the invention to provide this means for use with a propelling vehicle and a trailing vehicle preferably of the four-wheeled type, wherein the means operates to raise the front end of the trailer vehicle to transfer some or all of the weight of the raised portion to the rear portion of the propelling vehicle or tractor.

Another object is to utilize the raising means for adjusting the height of the draft element to facilitate hitching the tractor and trailer.

Another object is to provide for the removal of the front wheels of the trailer to provide additional clearance when the trailer is raised.

Another object is to provide the raising means in the form of a power operated device controllable at the will of the operator and adapted to be utilized according to the circumstances encountered in the operation of the unit, wherein the means may be controlled to transfer load or weight by gradations, so that the front part of the trailer is raised to different degrees, with the front wheels clear of the ground or merely relieved of some part of the weight of the trailer.

Briefly, and specifically, these and other important objects are achieved in one preferred form of the invention wherein the hauling unit consists of a tractor and a four-wheeled trailer. A draft connection is pivotally connected at its opposite ends on transverse axes to the rear of the tractor and the front of the trailer. A raising means, preferably power operated, such as a two-way hydraulic cylinder, is connected between the draft member or connection and a front portion of the trailer. A suitable control means on the tractor is available for actuation by the operator to operate the hydraulic cylinder whereby the forward end of the trailer and the draft connection are moved relatively either to raise the forward end of the trailer to a position with its wheels free of immediate ground contact or to raise the rear wheels of the tractor. It will be understood that it is not always necessary that the front wheels of the trailer be raised clear of the ground but that, depending upon the circumstances, the trailer may be raised sufficiently to relieve the wheels of at least part of the load of the trailer. Where the front wheels of the trailer are equipped with pneumatic tires, a slight raising of the trailer, enough to take the "flex" out of the tires, may be sufficient. Similarly, a sufficient raising of the trailer may be had at times by taking the "flex" out of structural parts of the trailer front support. The result is that at least part of the weight of the forward end of the trailer is no longer carried entirely on the trailer front wheels but is temporarily transferred to the rear of the tractor. It is not necessary that the tractor be especially designed or possess heavy-duty structural characteristics to accommodate this weight, since the weight is more or less temporary, depending upon the circumstances encountered. Since the cylinder is of the two-way type, it may be operated to contract the distance between the proximate ends of the tractor and trailer and thus to raise the rear wheels of the tractor.

The means for raising the draft element may be utilized in adjusting the height of the element for facilitating connection with the tractor.

A more complete understanding of these and other desirable objects and features of the invention may be had from the following detailed description taken in conjunction with the accompanying sheets of drawings.

DESCRIPTION OF THE FIGURES IN THE DRAWING

Figure 1 is a side elevational view of a unit comprising a tractor and trailer, and embodying one form of the invention;

Figure 2 is a plan view of the same;

Figure 5 is a side elevational view, partly in section, of the rear portion of the tractor and the front portion of the trailer embodying another form of the invention;

Figure 6 is a similar view, showing another form of the invention;

Figure 7 is a front elevational view, partly in section, of the construction shown in Figure 1, the view being taken substantially along the line 7—7 of Figure 1.

GENERAL DESCRIPTION

*Figures 1 to 4, and 7*

Figure 3:
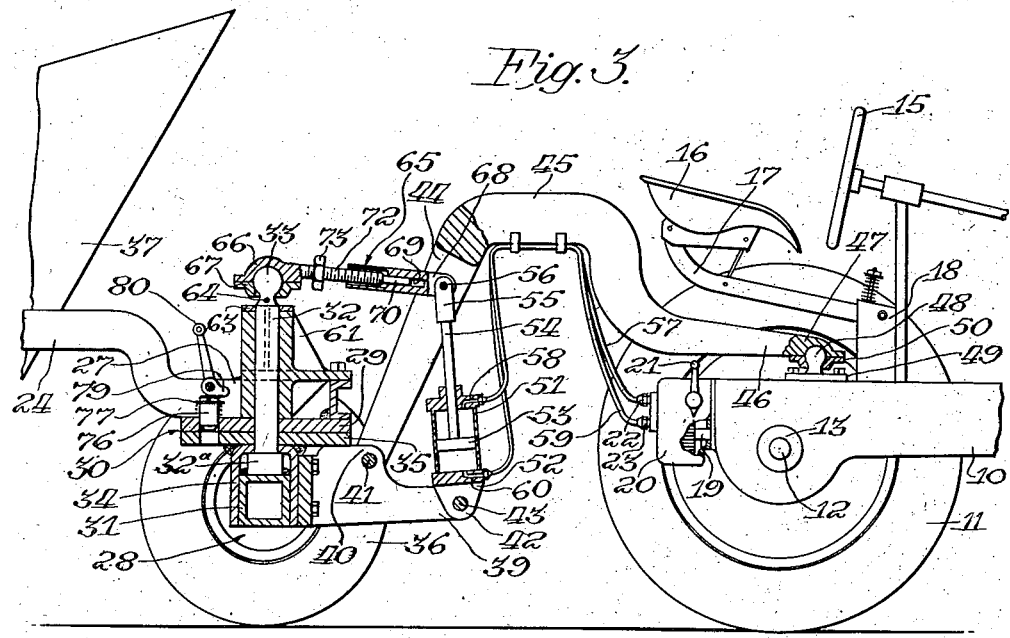
Figure 3 is an enlarged side elevational view, partly in section, of the rear part of the tractor and the forward part of the trailer.

Having particular reference to the construction shown in Figures 1 to 4, and 7, it will be seen that the hauling unit comprises a propelling or draft vehicle in the form of a tractor and a load-carrying vehicle in the form of a trailer. The tractor and trailer are illustrated in conventional positions, that is, with the trailer disposed rearwardly of the tractor; but it will be understood that any form of arrangement between the two vehicles may be utilized in adapting the improved constructions provided by the present invention.

The tractor is of a generally conventional type having a main frame 10 carried on a pair of rear drive wheels 11 driven by axles 12 suitably carried in axle housings 13 extending transversely at opposite sides of the body 10. The body includes further the usual fuel tank structure 14, steering wheel 15, and operator's station 16. The seat 16 is suitably carried by a rearwardly extending support 17 carried in a bracket 18 rigidly secured to the upper portion of the body 10. The forward portion of the tractor construction has been omitted from the drawings.

As best shown in Figure 3, the tractor is provided with a power source in the form of the customary power take-off shaft 19. A fluid pump housing 20 contains suitable pump mechanism driven from the shaft 19. This housing is rigidly carried at the rear of the tractor, and may assume any appropriate form. A control lever 21 is movably carried by the housing 20 and is adapted to control a supply of fluid through a pair of outlets 22 and 23. A preferable form of construction includes the use of a hydraulic pump system, and the outlets 22 and 23 are suitably connected to a force-exerting or power device in the form of a hydraulic cylinder, preferably of the two-way type, as will hereinafter more fully appear.

In a preferred form of construction, the trailer comprises a main frame 24 suitably carried on a rear ground support structure 25, which includes a pair of load-carrying wheels 26. The forward portion of the frame 24 is curved downwardly and converges to provide a central support 27 for a front ground support structure or axle assembly 28. As best shown in Figure 3, the main frame 24 is channel shaped in cross section, and rigidly carries at an under side thereof the upper half 29 of a swivel mounting or turntable structure 30. The axle assembly includes a transverse front axle 31, preferably formed tubular in cross section and having rigidly secured thereto, as by welding, an upstanding connecting member in the form of a column 32. The upper end of the column 32 is provided with a ball 33. The lower portion of the column 32 is enlarged, as at 32a, to provide a shoulder which abuts the under surface of a transverse channel member 34 having its opposite legs welded to the front and rear sides, respectively, of the tubular axle member 31. The upper outer portion of the channel 34 is rigidly secured to the lower half 35 of the turntable structure 30. The construction thus provided disposes the turntable parts 29 and 35 for relative movement about the vertical axis of the column 32. The axle assembly 28 and the parts 34, 35, and 32 are preferably rigidly secured together as a unitary structure. The opposite ends of the axle 31 suitably journal load-carrying wheels 36. The trailer main frame 24 is thus normally carried at its front and rear ends by the front and rear wheels 36 and 26, respectively. A load-carrying body 37 is appropriately mounted on the frame 24 and is provided in the usual manner with a dumping bottom 38. It will be understood, of course, that the particular construction of the trailer is not material to the description of the invention, and has not, therefore, been more fully described in detail.

As previously described, the front portion of the main frame 24 of the trailer is bent downwardly and forwardly. This arrangement enables the rearward portions of the main frame to be disposed at a height sufficient to allow the front wheels 36 to pass thereunder when short turns are being made. For the purpose of steering the trailer from the tractor, the front axle structure 28 is provided with a forwardly extending hitch or connecting member 39. This member is preferably in the form of a casting or forging, and is rigidly secured to the front portion of the axle channel 34. The member 39 includes a pair of laterally spaced ears 40, apertured to receive pins 41. The member further includes a forwardly extending portion or connecting member 42 disposed considerably ahead of the axis of the pins 41. This portion is apertured transversely to receive a pin 43. The pins 41 are pivotally connected, respectively, to the lower portions of a pair of legs 44 comprising integral parts of a forwardly extending, arched draft element 45. This element is preferably in the form of a forging or casting, or may be suitably composed of a number of parts welded together. The upper portion of the draft element 45 is disposed at a height sufficient to allow the passage thereunder of the rear wheels 11 of the tractor when short turns are being made. The forward portion of the draft element 45, extending downwardly and forwardly, as at 46, is provided with the upper half 47 of a socket. This socket fits over a ball 48 of a pivot member 49 rigidly carried by an upper portion of the tractor body 10, preferably on a vertical axis disposed forwardly of the transverse axis of the rear drive wheels 12. A cap 50 cooperates with the socket portion 47 and the ball 48 to provide a suitable ball and socket joint. From the description thus far set forth, it will be seen that the tractor and trailer are articulately interconnected by means of the draft element 45, the rear end of the element 45 being pivotally connected to the trailer on a transverse axis passing through the pivot or connecting pin 41, and the forward end of the element 45 being pivotally connected on both transverse and vertical axes provided by the ball and socket connections 47, 48. The tractor and trailer are thus enabled to have relative vertical movement as uneven ground contour is followed. The draft connection provides, in somewhat the usual manner, for the steering of the trailer by movement of the tractor. The disposition of the parts is such as to facilitate short turning and to otherwise adapt the unit for flexible maneuverability.

As previously set forth, operating conditions often become such as to require special devices to enable the tractor to obtain the traction necessary to move the loaded trailer. For the purpose of meeting the traction requirements, the present invention provides for the temporary transfer of part of the weight of the trailer to the rear portion of the tractor body 10; or, in other words, a downward pressure from the trailer to the tractor. Since the ball and socket joint is located in the vicinity of the center line of the tractor axles 12, this weight will concentrate where needed. It will be noted that, since the ball and socket joint is disposed slightly forwardly of the axle center line, there is no danger of the additional weight tipping the tractor rearwardly. The important object of the invention is to provide this weight-transferring means in such a manner as to adapt the weight to be transferred to the tractor as needed, wherein larger or smaller portions of the weight may be so transferred according to the particular traction requirements encountered.

One form of means for accomplishing the objects set forth is shown in Figures 1 to 4, and 7. This means consists of a power-operated means preferably in the form of a two-way hydraulic cylinder 51 having its lower end provided with an ear 52 pivotally connected to the pin 43 carried by the hitch member 39 secured to the front axle assembly 28. The cylinder is provided with a piston 53 having an upwardly extending piston rod 54, provided at its upper end with a connecting member 55, pivotally connected by a transverse pin 56 to an upper portion of the draft element 45, which functions as part of the tractor, since through it the forces applied through the cylinder ultimately concentrate on the tractor. The positions of the parts in Figure 3 are those assumed when the unit is normally operating. The entire load of the trailer is carried wholly on the front and rear wheels of the trailer. The draft connection 45 is subject only to draft forces as the tractor draws the trailer. As previously described, the hydraulic pump 20 is provided with the outlets 22 and 23. The outlet 23 is connected by a suitable supply conduit 57 to an inlet 58 in the upper portion of the cylinder 51. The lower outlet 23 of the pump 20 is connected by a conduit 59 to an inlet 60 at the bottom of the cylinder. It will be understood that the inlets 58 and 60 serve also as outlets, depending upon the operation of the cylinder and movement of the piston 53. The cylinder illustrated is of the so-called two-way type, wherein the piston is operated to move in either of the two directions. The hydraulic system may be of any suitable type and has, therefore, been illustrated rather generally.

As previously described, the front axle assembly 28 includes the vertical column 32. In order to properly support the column, the forward portion of the main frame 24 of the trailer is provided with a suitable forged or cast bracket 61, rigidly secured to the upper flange of the main frame 24 by bolts 62. The bracket is bored vertically to receive the column 32. A washer 63 is carried at the upper end of the bracket and surrounds the column 32. The column is provided with a transverse pin 64 abutting the upper surface of the washer 63 when relative vertical movement tends to occur between the main frame 24 and the front axle assembly 28. The construction is such as to provide a properly mounted front end assembly for the trailer wherein the front wheels 28 may be suitably steered and wherein separation of the component parts of the assembly is prevented as the trailer assumes various positions during operation.

Figure 4:
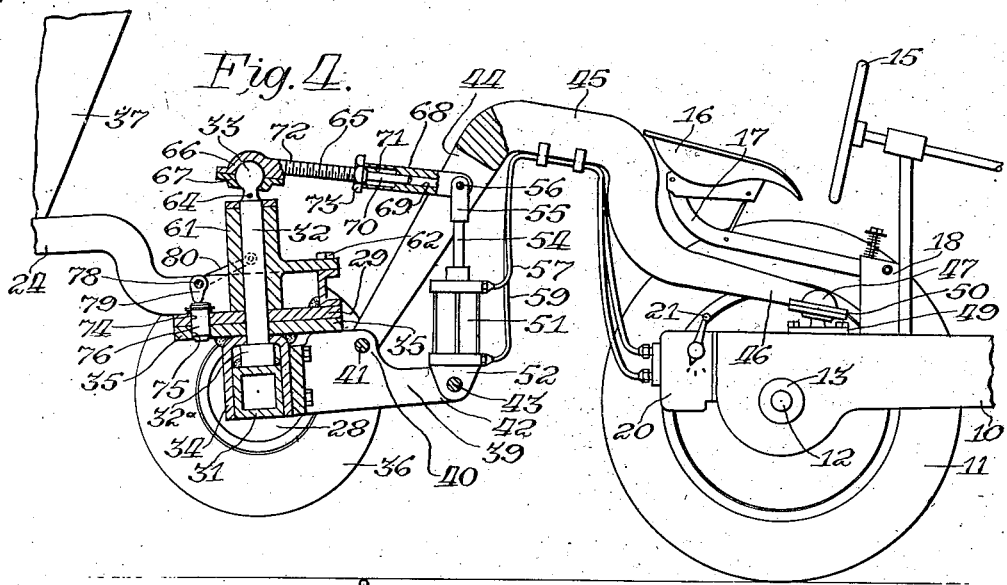
Figure 4 is a similar view, showing the front end of the trailer in raised position.

As set forth above, an important object of the invention is to provide means for locking the trailer in position with the front wheels raised from the ground so that the unit may be temporarily converted into a semi-trailer unit. For this purpose, a locking means, generally designated at 65, is secured between the ball 33 of the column 32 and the transverse pin 56 carried by the draft element 45. The means 65 includes a rigid member 66 having its rearward end provided with a socket portion engaging the ball 33 and cooperating with a cap 67 to provide a ball and socket joint. The other portion of the means 65 includes a sleeve member 68 having its forward end pivotally carried on the transverse pin 56. The sleeve is bored at 69 to receive slidably the reduced forward end 70 of the part 66. The sleeve is further provided with an enlarged bore 71 slightly larger than the intermediate threaded portion 72 of the part 66. This threaded portion carries a large nut 73. As best shown in Figure 3, wherein the hauling unit is illustrated in normal operating position, the nut 73 is backed off toward the rearward end of the part 66. The reduced portion 70 of the part 66 is slidably carried in the bore 69 in the sleeve member 68. Relative movement of the parts resulting in changes in position thereof is not interfered with by the locking means 65 in the position shown in Figure 3. Similarly, the hydraulic means does not interfere with the relative movement of the parts during operation of the unit. Because the recess or bore 71 in the sleeve 68 is slightly larger than the threaded portion 72 of the part 66, the threaded portion is not damaged as the parts 66 and 68 have relative sliding movement, the forward portion 71 of the part 66 being totally guided in the bore 69 of the member 68. As shown in Figure 4, when the front end of the trailer is raised, the nut 73 is moved forwardly to abut the rear end of the sleeve 68. In this position the angle between the draft element 45 and the trailer is maintained and the unit is thus locked in "semi-trailer position." During this position the hydraulic cylinder unit may be removed and utilized elsewhere, if desired. It will be obvious, of course, that the cylinder may be retained in place and a supply of fluid maintained therein to lock the piston in position, the cylinder and piston thus serving as the equivalent of the locking means 65.

Another important object of the invention is to provide means for locking the front wheels 36 against steering when the trailer is in raised position. For this purpose, a suitable means has been provided for locking the turntable parts 29 and 35 against relative movement. The turntable parts 29 and 35 are provided with vertical openings 74 and 75, respectively. The turntable part 29 carries a vertically slidable pin 76 normally disposed within the opening 74. A coil spring 77 maintains the normal position of the pin 76 out of engagement with the turntable 35. A transverse rockshaft 78, carried by the transversely spaced portions of the forward portion of the trailer frame 24, rigidly carries a cam member 79 and an upwardly extending lever 80. As shown in Figure 4, forward movement of the lever 80 rocks the rockshaft 78 to move the cam member 79 about its axis for the purpose of moving the pin 76 downwardly and into engagement with the turntable 35. The position assumed by the cam 79, as shown in Figure 4, is over dead center, so that there is no danger of the pin 76 moving vertically accidentally. In this position of the parts, the entire front structure of the trailer is rendered temporarily rigid or unitary. It will be understood that the locking means just described may be utilized on the tractor to lock the draft element 45 against movement with respect to the tractor, it being important to note here that, when the trailer is raised for any substantial period for conversion temporarily to a "semi-trailer," it may be desirable to eliminate pivotal movement at either of the axes through the ball and socket joint on the tractor or through the steering pivot of the trailer. Further details of the operation of the form herein illustrated will appear later.

*Figure 5*

Reference will now be had to the form of the invention illustrated in Figure 5. In this form the tractor and trailer and component parts thereof are identically the same as the corresponding parts described in the foregoing description, and similar reference characters have been used to designate corresponding parts. In this instance the hydraulic power means is connected between the transverse pin 56 in the draft element 45 and the ball 33 at the upper end of the column 32. The connection between the cylinder and the draft member forms an indirect connection to the tractor, the structure in this respect being similar in import to that shown in and described in regard to Figures 1 to 4, and 7. The cylinder in this case is also of the two-way type, and is designated generally by the numeral 81, and includes a piston rod 82 having a socket portion 83 and cap 84, to provide a ball and socket joint with the ball 33. The cylinder is generally similar to the cylinder 51 in the form previously described, and is connected to the hydraulic pump outlets 22 and 23 by a pair of conduits 85 and 86, respectively. The fluid is supplied to the cylinder to expand the distance between the points 56 and 33, with the resultant effect that the forward end of the trailer may be raised vertically. The parts are so interconnected that a polygonal structure, here a triangle, is formed with its apices at the points 33, 41, and 56. Accordingly, when the distance between the points 56 and 33 is increased, the point 41 moves vertically. A detailed description of the operation of this form of the invention will appear below.

*Figure 6*

Figure 8:
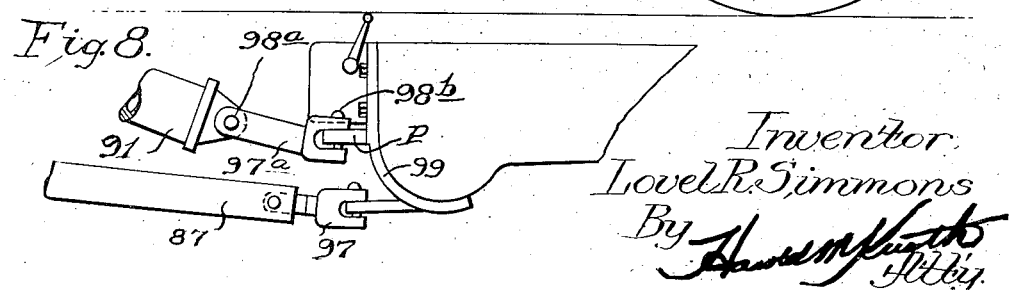
Figure 8 is a fragmentary side elevational view of the tractor rear axle housing illustrated in Figure 6, showing an alternative method for connecting the lower end of the distensible assembly therewith.

The form of the invention shown in Figure 6 is somewhat similar to that shown in Figure 5. The draft connection, however, is of a different type and consists generally of a draft element 87 generally approximating the usual type of draft element employed in connecting tractors and trailers. The draft element 87 carries near its forward end an upstanding bracket 88 rigidly secured to the element by bolts 89 and being provided with a transverse pin 90. A hydraulic cylinder 91, provided with a piston 92, is connected at one end to the pin 90 and at its other end is associated with the ball 33 by means of a socket portion 93 and a cap 94 provided at the upper rearward end of the piston 92. The forward portion of the draft member 87 and bracket 88 provide means by which the cylinder 91 is connected to the tractor. As stated previously, the connection of the cylinder and tractor may be just as advantageously made through a bracket mounted directly on the tractor. Such an arrangement is illustrated in Fig. 8 where an apertured projection P is formed on the bracket 99 for the universally articulate connection therewith of the lower end of the cylinder 91 through a double yoke member 97a similar to the member 97 and having pivot pins 98a and 98b respectively pivotally connecting its opposite ends with the cylinder and with said extension. Fluid is supplied to the cylinder 91 through conduits 95 and 96, respectively connected to the fluid supply outlets 22 and 23 of the pump 20. The forward end of the draft element 87 is provided with a clevis 97 connected by a pin 98 to a draw bracket 99 rigidly secured to the body 10 of the tractor. The functioning of the cylinder and piston, 91 and 92, is such as to expand or contract the distance between the points 90 and 33. The arrangement of the parts is such as to provide a triangle having at its apices the points 33, 41, and 90, so that, when the distance between the points 33 and 90 is increased, the point 41 moves vertically.

The draft element 87 is provided with a transversely disposed aperture 100. When the forward end of the trailer is raised, this aperture 100 becomes alined with the forward aperture 42 in the hitch member 39 which formerly carried the connecting pin 43 (Figures 1 to 4, and 7). In order that the trailer may be locked in the raised position, a bar may be inserted through the apertures thus alined.

A suitable locking means has been provided for maintaining the raised position of the trailer in conjunction with the construction shown in Figure 5. This means consists of a threaded bar 101 having at opposite ends connecting members 102 and 103. The upper member 102 is pivotally carried by the pin 56 carrying the hydraulic cylinder 81. The lower end is apertured at 104 and during normal operation of the unit is not otherwise connected. When the front end of the trailer is raised by expansion of the cylinder 81, the aperture 104 may be alined with the aperture 42 in the bracket 39 which formerly carried the connecting pin 43 (Figures 1 to 4, and 7). The members 39 and 103 may be thus suitably connected to lock the parts in position.

It will be understood, of course, that the turntable locking device described in connection with the first form of the invention may be utilized in all forms, and, accordingly, has not been shown separately in the figures illustrating the separate forms.

OPERATION

Figures 1 to 4, and 7

In the operation of the construction shown in Figures 1 to 4, and 7, the parts assume the positions illustrated in Figures 1 and 3. In this position the trailer normally follows the tractor, and arrangement is such that there is no interference with the normal, free, movement of the parts as varying ground contour is encountered. When the trailer, which may have a large capacity, is loaded and the unit is operated over surface conditions wherein the tractor cannot obtain sufficient traction, the control lever 21, readily accessible from the operator's seat 16, is rocked to supply fluid through the conduit 57 to the upper portion of the cylinder 51, thus moving the piston 53 downwardly in the cylinder and decreasing the distance between the points 43 and 56. The points 56 and 43 constitute, with the point 41, the apices of a polygonal structure, here a triangle. When the distance between the points 56 and 43 is decreased, the point 41 is caused to move rearwardly and upwardly and the entire trailer pivots about the rear wheels 26. It will be understood that it is not necessary that the front wheels of the trailer be raised entirely from the ground at all times. It may be that the traction requirements are such that a slight transfer of the trailer weight to the tractor will be sufficient to enable the tractor wheels to obtain the traction necessary to move the trailer. It may occur that a slight raising of the front portion of the trailer, enough to take the "flex" out of the tires and structural parts, will be sufficient. The fundamental principle is that part of the weight normally carried by the front wheel assembly of the trailer is transferred to some extent to the drive wheels of the tractor. The positions of the parts illustrated in Figure 4 are those assumed when the front end of the trailer is lifted to a position with the wheels 36 entirely clear of the ground. It is in this position that the trailer is best adapted for conversion to a semi-trailer unit, and the locking means 65 and the turntable locking means 76 may be locked to render rigid the forward construction of the trailer. The necessary pivotal movement between the tractor and trailer is afforded by the ball joint connection at the forward end of the draft element 45.

When the fluid is supplied to the other side of the piston, the distance between the points 56 and 43 is increased, thus exerting a lifting force on the draft member 45, which, being connected to the tractor, raises the rear end of the tractor. The tractor may be raised sufficiently so that the rear wheels thereof clear the ground. In this instance, the wheels may be removed, for example, or other repairs or the like performed on the tractor.

Another feature of this form of construction is that the cylinder 51 may be utilized for raising and lowering the draft element 45 in connecting the element to the tractor. The fluid supply conduits 57 and 59 are sufficiently long to enable connection thereof to the hydraulic pump 20 before the draft element 45 is connected to the ball 48 of the tractor. According to this arrangement, fluid may be supplied to either end of the piston 53 for the purpose of moving the draft element vertically upwardly or downwardly. Accordingly, the vertical position of the forward end of the draft element 45 may be adjusted to a height facilitating connection thereto of the ball 48 on the tractor. All this may be accomplished merely by connecting the conduits 57 and 59, to the pump 20.

Figure 5

The operation of the form shown in Figure 5 is such as to accomplish the same or similar results. When the control lever 21 on the pump 20 is operated, fluid is supplied at the will of the operator to either end of the cylinder 81. As previously mentioned, expansion of the cylinder and piston to provide for increasing the distance between the points 56 and 83 moves the point 41 upwardly. Here, as in the foregoing instance, fluid may be supplied to raise the front end of the trailer to greater or lesser extents according to the particular conditions under which the unit is operated. Further, the conduits 85 and 86 may be connected to the pump 20 prior to the connection of the draft element 45 to the ball 48 on the tractor. In this manner, the cylinder 81 may be utilized to adjust the vertical height of the draft element 45 preparatory to connection thereof to the ball 48. This feature is important when it is considered that the draft element 45 is comparatively heavy and would be difficult to lift manually.

Figure 6

The operation of the construction shown in Figure 6 is substantially identical to that shown in Figure 5. Expansion of the cylinder and piston, 91 and 92, increases the distance between the point 90 on the draft element 87, and the point 33 on the column 32. The increase in the distance between these two points causes upward movement of the point 41 on the hitch member 39. The supply of fluid to the cylinder 91 may be suitably regulated as in the preceding instances by the control lever 21 on the pump 20.

From the foregoing description it will be seen that the desirable objects set forth above are capable of accomplishment by the present invention. The numerous features of the invention are important in any instance in which a trailing vehicle or implement is connected behind a tractor. It will be understood, of course, that the use of the invention is not limited to arrangements consisting solely of tractors and trailers, but that any type of propelling or draft vehicle, and any form of trailing vehicle or implement, such as scrapers, graders, and the like, may be readily provided with means according to the present invention. In the particular instance of a trailing vehicle of the type adapted to carry considerable loads, the invention becomes important in providing a unit construction readily adaptable to the varying conditions encountered. On a large number of construction programs involving grading, scraping, and hauling, wherein a unit consisting of a tractor and trailing vehicle is employed, a certain operating cycle is encountered. During this cycle the tractor obtains sufficient traction perhaps 95% of the time. During the other 5% of the cycle, the tractor is unable to obtain sufficent traction to move material. It has been heretofore necessary, merely to accommodate this 5% of the cycle, that the hauling unit include a tractor having sufficient traction to move the unit through the adverse condition encountered during this short period. Accordingly, a total burden of expense was necessarily assumed to return a benefit during only 5% of an operating cycle, and it was consequently necessary that during the remaining period the burden of expense, represented by a specially constructed tractor and trailer, remained idle. According to the present invention, the same unit may be utilized at all times and due regard has been had to providing means for accommodating the adverse conditions encountered during a minor period of the operating cycle at a minimum of expense. Consequently, the tractor may be of the ordinary type and need not be specially constructed to carry superimposed trailer loads at all times. It is understood that in no case is the entire load of the trailer superimposed on the tractor, but it is only the load or weight of the forward end of the trailer that is so transferred. The temporary transfer of such weight is comparatively immaterial as regards any adverse effect on the tractor. For example, a tractor constructed sufficiently strong to carry four yards of superimposed material in conjunction with a semi-trailer, but sufficiently powerful to draw twenty yards of material on a full trailer, is necessarily limited in use, because it is unable to obtain the traction necessary to move twenty yards of material up even a slight incline. Accordingly, it has heretofore been necessary to carry smaller quantities of material in order that the unit could operate throughout the entire cycle. It will be appreciated that the highest rate of efficiency and capacity was not obtained. According to the present invention, the unit may carry or haul twenty yards of material—or its equivalent in weight in some other respect—(according to the foregoing example) at all times, since a portion of this weight may be temporarily transferred between the front wheels of the trailer and the rear wheels of the tractor as needed to provide weight on the rear end of the tractor to enable the tractor to obtain sufficient traction.

It will be observed that a semi-trailer unit of the conventional type necessarily involves a more expensively constructed trailer, since the wheelbase of such trailer is considerably long, being measured by the distance between the tractor rear wheels and the trailer wheels; hence, the frame of the trailing vehicle must be extra strong to carry the load between these wheels. A four-wheel trailer, on the other hand, may be less expensively constructed, since the wheel-base is shorter, being measured between the front and rear trailer wheels. Various other disadvantages, inherent in semi-trailer units, are eliminated by the present invention; and, at the same time, those desirable features of a semi-trailer unit are retained and are combinable with the benefits derived from the use of a full or four-wheel trailer.

It will be appreciated that similar problems arise in connection with a unit comprising a tractor and scraper or grader, wherein the grader encounters particular resistance, or wherein the tractor cannot obtain sufficient traction. It will be further appreciated that the invention may be adapted to various operating vehicles or implements and attachments, and it is not intended that the invention be limited by the foregoing disclosure.

The term "ground support" as employed in the appended claims is construed to include wheels or their equivalent together with the connecting structure between said wheels and the vehicle body or frame. The term "fluid column" as employed in some of the appended claims refers to a body of fluid between the motor piston and an end of the motor cylinder for moving or holding the piston to or in a desired position axially of the cylinder.

It is to be understood that only preferred forms of the invention have been illustrated and described, and it is obvious that numerous modifications and alterations in the constructions illustrated may be made without departing from the spirit and scope of the invention as defined in the appended claims.

What is claimed is:

1. In combination, a first vehicle including a draft member pivoted to the first vehicle for both lateral and vertical movement with respect thereto; a second vehicle having front and rear ground supports; means mounting the front ground support on the second vehicle for steering movement; means connecting the draft member to the front ground support of the second vehicle for lateral swinging of said member to steer the front ground support; an anchorage on a front portion of the second vehicle above the front ground support, and means comprising a fluid motor connected between the first vehicle and said anchorage for moving the front end of said second vehicle upwardly with respect to the first vehicle, and the connection between said means and said anchorage including a pivot on a substantially vertical axis.

2. In combination, a tractor, a trailer having front and rear ground supports normally carrying the load thereof, a fifth-wheel structure at the front of the trailer and carrying the front ground support, a draft element between said structure and the tractor, means connected between the tractor and the trailer independently of the fifth-wheel structure for raising the front end of the trailer, said means including a pivotal connection on the trailer in substantially vertical alinement with the fifth-wheel axis, and means for locking the fifth-wheel structure against movement with respect to the trailer.

3. In combination, a first vehicle, a second vehicle having a ground support mounted thereon for pivoting about a vertical axis, a member connecting the vehicles for travel together and including means at one end connecting the member to the ground support and means at its other end pivotally connecting the member on a vertical axis to the first vehicle, means connected between the vehicles for raising one vehicle with respect to the other, and means connectable between the member and one of the vehicles for locking the member against pivotal movement about a vertical axis.

4. In combination, a first vehicle, a second vehicle, a member connecting the vehicles for travel together and including means at one end connecting the member to the second vehicle on a transverse pivot axis and means at its other end pivotally connecting the member on a transverse pivot axis to the first vehicle, means connected between the vehicles for raising one vehicle with respect to the other to transfer at least part of the weight of the raised vehicle to the other, and means connectable between the member and one of the vehicles for locking the member against pivotal movement about a transverse axis.

5. In combination, a draft vehicle including a draft member pivotally connected to the draft vehicle for lateral movement with respect thereto; a trailing vehicle having a front ground support; a pivot member carried by the trailing vehicle above the front ground support; means pivotally connecting the draft member to the trailing vehicle for lateral movement with respect thereto about an axis substantially vertically alined with and below the pivot member; forcibly extensible means between the vehicles; means connecting said extensible means to the pivot member on the trailing vehicle; means connecting said extensible means to the draft vehicle; and means for operating said extensible means for exerting a raising force on the front end of the trailing vehicle as respects the draft vehicle while the draft member serves to prevent separation of the vehicles.

6. In combination, a draft unit; a trailing unit carried on front and rear ground supports, said supports normally carrying the weight of the trailing unit; a draft member pivotally connected respectively at opposite ends to the draft unit and trailing unit and normally non-weight supporting as respects the units, said member including a forward part extending upwardly from a pivotal connection on the draft unit, an upper part extending rearwardly, and a rear part extending downwardly from the upper part to the pivotal connection with the trailing unit; a connecting member rigidly associated with the trailing unit and extending forwardly of the pivotal connection between the trailing unit and the draft element and below the upper part of the draft element; and a forcibly contractible means connected between said connecting member and an upper part of the draft member and arranged to form one side of a triangle including as its other two sides the connecting member and the rear part of the draft member, said means being contractible to draw the draft member and connecting member together about the pivotal connection of the draft member with the trailing unit for raising the front of the trailing unit.

7. In combination, a draft unit; a trailing unit carried on front and rear ground supports, said supports normally carrying the weight of the trailing unit; a draft member pivotally connected respectively at opposite ends to the draft unit and trailing unit and normally non-weight supporting as respects the units, said member including a forward part extending upwardly from the pivotal connection on the draft unit, an upper part extending rearwardly toward the trailing unit, and a rear part extending downwardly from the upper part to the pivotal connection with the trailing unit; a connecting member rigidly associated with the trailing unit and extending upwardly past the pivotal connection between the trailing unit and the draft element and rearwardly of the rear part of the draft element; and a forcibly expansible means connected between said connecting member and an upper part of the draft member and arranged to form one side of a triangle including as its other two sides the connecting member and the rear part of the draft member, said means being expansible to spread the connecting member and draft member apart about the pivotal connection between the draft member and the trailing unit for raising the front of the trailing unit.

8. In combination, a tractor including a draft member at the rear thereof; a trailer having ground supports; means connecting the rear end of the draft member to the front of the trailer; forcibly extensible means between the tractor and the front of the trailer; means connecting said extensible means at one part thereof to the trailer at a point spaced above the draft member and the ground supports; connecting means effecting a connection of both the draft member and another part of the extensible means to the tractor; and means for operating said extensible means to exert a force between said connecting means and the trailer for raising the trailer together with a ground support thereof with respect to the tractor for relieving said ground support of at least part of the weight of the trailer and for shifting weight to the tractor.

9. In combination, a tractor including a draft member pivotally connected to the tractor for both lateral and vertical movement with respect thereto; a trailer; rear ground supports on the trailer; a steerable front ground support structure for the trailer; the front and rear ground supports normally carrying the entire weight of the trailer, a pivot member rigidly carried at the upper front part of the trailer above the front ground support structure, means pivotally connecting the draft member to the trailer front ground support structure for vertical movement with respect thereto, the draft member having lateral movement with respect to the trailer body with the front ground support structure about the steering axis thereof; forcibly expansible and contractible means connected at one end to the aforesaid pivot member; means connecting said means to the tractor, said forcibly expansible and contractible means comprising a two-way pressure cylinder and piston forcibly expansible between the tractor and the pivot member for raising the front end of the trailer with respect to the tractor and forcibly contractible between the tractor and the pivot member for raising the rear end of the tractor with respect to the trailer, said means being lockable for locking the trailer and tractor together against relative vertical movement in at least one direction.

10. In combination, a tractor, a trailer having a body, front and rear ground supports on the trailer, a connecting member rigidly carried at the upper front part of the trailer body above the front ground support, a draft member pivotally connected to the tractor for both lateral and vertical movement with respect thereto and pivotally connected to the trailer front ground support structure for vertical movement with respect thereto, forcibly expansible and contractible means connected between the draft member and the aforesaid connecting member, said means comprising a two-way pressure cylinder and piston forcibly expansible between the draft member and the connecting member for raising the front end of the trailer with respect to the tractor and forcibly contractible between the same members for raising the rear end of the tractor, and means for locking the trailer and draft element together in any position, whereby the draft element is rigid against vertical movement with respect to the trailer.

11. In combination, a draft unit; a trailing unit carried on front and rear ground supports, said supports normally carrying the weight of the trailing unit; a draft member pivotally connected respectively at opposite ends to the draft unit and trailing unit and normally non-weight supporting as respects the trailing vehicle, said member including a forward part extending upwardly from the pivotal connection on the draft unit, an upper part extending rearwardly toward the trailing unit, and a rear part extending downwardly from the upper part to the pivotal connection with the trailing unit; a connecting member rigidly associated with the trailing unit and extending forwardly of the pivotal connection between the trailing unit and the draft element and below the upper part of the draft element; a second connecting member rigidly associated with the front of the trailer at a point rearwardly of the rear part of the draft member and above the pivotal connection between the draft member and the trailer; a two-way pressure cylinder between an upper part of the draft member and one connecting member for moving the forward end of the draft member downwardly or upwardly about its pivotal connection with the trailer to apply pressure to the draft vehicle or to the trailer respectively; and locking means between the draft member and the second connecting member for locking the draft member in position against vertical movement.

12. In combination, a draft unit; a trailing unit carried on front and rear ground supports, said supports normally carrying the weight of the trailing unit; a draft member pivotally connected respectively at opposite ends to the draft unit and trailing unit and normally non-weight supporting as respects the trailing vehicle; a connecting member on the trailing unit and disposed at a point forwardly of the pivotal connection between the trailing unit and the draft element and below the draft element; a second connecting member on the front of the trailer at a point above the pivotal connection between the draft member and the trailer; a two-way pressure cylinder between the draft member and one connecting member for moving the forward end of the draft member downwardly or upwardly about its pivotal connection with the trailer to apply pressure to the draft vehicle or to the trailer respectively; and locking means between the draft member and the second connecting member for locking the draft member in position against vertical movement.

13. In combination, a draft unit, a trailing unit normally carried on front and rear ground supports, a draft member pivotally connected at its front end to the rear of the draft unit and at its rear end pivotally connected to the front of the trailing unit for pivotal movement with respect thereto about a horizontal axis, and forcibly expansible and contractible means including a two-way pressure device connected between the draft member and a front part of the trailing unit at a fixed position thereon, said means being forcibly expansible or contractible selectively to press the front end of the draft member downwardly onto the draft unit while pivoting the draft member about said horizontal axis for moving the rear end of the draft member and the front end of the trailing unit upwardly with respect to the draft unit or to pivot the draft member oppositely about said horizontal axis to move the front end of the draft member and the rear end of the draft unit upwardly with respect to the trailing unit.

14. In combination, a draft vehicle including a draft member pivotally connected to the rear thereof; a second vehicle including front and rear ground supports and arranged behind the draft vehicle; means pivotally connecting the draft member to the front of the second vehicle for pivotal movement with respect thereto about a horizontal axis; forcibly expansible and contractible operating means including a two-way pressure device disposed between the front of the second vehicle and a fixed position on the rear of the draft vehicle; means connecting said operating means to the second vehicle; and means connecting said operating means to the draft vehicle, said operating means being forcibly expansible or contractible selectively to press the front end of the draft member downwardly onto the draft vehicle while pivoting the draft member about said horizontal axis for applying a lifting force on the front end of the second vehicle from the draft vehicle or to pivot the draft member oppositely about said horizontal axis while applying a lifting force to the rear end of the draft vehicle from the second vehicle.

15. In combination, a first vehicle including a draft member pivotally connected at one end thereto; a second vehicle carried on front and rear ground supports, the front support being swingable laterally as the second vehicle changes direction; means pivotally connecting the draft member at its other end to the second vehicle, whereby the draft member may be swung laterally by the first vehicle to change the direction of travel of the second vehicle; an anchorage on a portion of the second vehicle above the front support; force-exerting means including a fluid motor for withdrawably disposing a fluid column between said anchorage and the rear of the first vehicle for moving the front end of the second vehicle upwardly with respect to the first vehicle; means connecting said force-exerting means to the first vehicle; and means for operating said force-exerting means between the vehicles cooperably with said draft member to raise the front end of the second vehicle for relieving pressure of the front end of the second vehicle on its front ground support and for transferring this pressure to the other vehicle.

16. In combination, a draft vehicle, a trailing vehicle having front and rear ground supports normally carrying the load thereof, a swivel structure at the front end of the trailing vehicle and mounting the front ground support, a draft member connected between said structure and the draft vehicle, means arranged between the front end of the trailing vehicle and the rear end of the draft vehicle for raising the front end of the trailing vehicle, means connecting the raising means to the draft vehicle, and means connecting the raising means to the trailing vehicle independently of the swivel structure, said means including a pivotal connection on the trailing vehicle in substantial vertical alinement with the swivel structure, and means for locking the front ground support against swivelling with respect to the trailing vehicle.

17. In combination, a draft vehicle including a draft member pivotally connected to the draft vehicle for both lateral and vertical movement with respect thereto; a trailing vehicle; rear ground supports on the trailing vehicle; a steerable front ground support structure on the trailing vehicle and pivotable about an axis for steering such vehicle, said ground supports normally carrying the weight of the trailing vehicle, a pivot member carried at the front of the trailing vehicle above the front ground support structure; means pivotally connecting the draft member to the trailing vehicle front ground support structure for movement therewith about the steering axis and also for vertical movement with respect to the trailing vehicle; forcibly expansible and contractible means disposed between the front of the trailing vehicle and the rear of the draft vehicle; means connecting said forcibly expansible and contractible means to a fixed position on the aforesaid pivot member; and means connecting said forcibly expansible and contractible means and the draft vehicle, said expansible and contractible means including a two-way pressure device forcibly expansible between the vehicles for moving the front end of the trailing vehicle upwardly with respect to the draft vehicle and forcibly contractible to move the rear end of the draft vehicle upwardly with respect to the trailing vehicle.

18. In combination, first and second vehicles arranged in end-to-end relationship with their proximate ends spaced apart and each including ground-engaging means supporting the vehicles, a first connecting member and a second connecting member carried at the proximate end of the first vehicle and spaced apart generally in a vertical plane and with the first connecting member substantially above said ground-engaging means, means arranged between the proximate ends of the vehicles and forming a structure generally in the form of a polygon, one of the sides of the polygon being formed between and including the aforesaid connecting members, a second side comprising a draft member extending between the proximate ends of the vehicles, means connecting one end of said member to the second connecting member, means pivotally conecting the other end of said member to the proximate end of the second vehicle, a third side of said polygon structure extending between the first connecting member and the second vehicle and including a pair of relatively movable members, means connecting one movable member to the first connecting member, means connecting the other of said movable members to the second vehicle, and means for forcibly moving said movable members relatively to exert a force between the proximate ends of said vehicles generally along said third side of said structure to raise one vehicle for transferring at least part of the weight of the raised vehicle to the other vehicle.

19. In combination, first and second vehicles arranged in longitudinal end-to-end relationship with their proximate ends spaced apart, each including ground-engaging means supporting the vehicles and having ground contact at a plurality of points, means between said ends of the vehicles forming generally a polygonal structure having at least a first corner adjacent the end of the first vehicle and second and third corners spaced apart and adjacent the end of the second vehicle, means pivotally connecting the second corner to said second vehicle, means pivotally connecting the third corner to said second vehicle, means pivotally connecting the first named corner to the end of the first vehicle, the side of the structure between the last named means and the third corner forming a connecting element for movement of the vehicles together over the ground, the side of the structure between the second corner and the first vehicle including a pair of relatively movable members, and means for forcibly moving said members relatively to vary the distance between portions of the proximate ends of said vehicles generally along said side of the structure for shifting at least part of the weight of one vehicle from one point of ground contact to another point of ground contact.

20. In combination, a pair of vehicles arranged in longitudinal end-to-end relationship with their proximate ends spaced apart longitudinally and each having ground-engaging means supporting said vehicles, a draft element extending generally longitudinally between the vehicles in the space therebetween, means connecting opposite ends of said draft element to the respective vehicles, anchorages fixed respectively upon said ends of the vehicles, the anchorage on at least one of the vehicles being spaced substantially above the draft element connection therewith; extensible means arranged generally longitudinally in the space between the vehicles and including a pair of relatively extendable members, means connecting one member to the anchorage on the end of one vehicle, means connecting the other member to the anchorage on the end of the other vehicle, and means for urging said members relatively to exert through said anchorages a force between and acting against the proximate ends of the vehicles to transfer pressure from one end of one vehicle on its ground-engaging means to the other vehicle.

21. In combination, a draft unit; a trailing unit carried on front and rear ground supports, said supports normally carrying the weight of the trailing unit; a draft member pivotally connected respectively at opposite ends to the draft unit and trailing unit and normally non-weight supporting as respects the units, said member including a forward part extending upwardly from a pivotal connection on the draft unit, an upper part extending rearwardly, and a rear part extending downwardly from the upper part to the pivotal connection with the trailing unit; a connecting member rigidly associated with the trailing unit; and force-exerting means connected between said connecting member and a part of the draft member, said means being operable to move the draft member about the pivotal connection thereof with the trailing unit for raising the front of the trailing unit.

22. In combination, first and second vehicles arranged in end-to-end relationship and each including ground-engaging means supporting the vehicles, a first connecting portion and a second connecting portion on the first vehicle and spaced apart, means forming a structure generally in the form of a polygon, one of the sides of the polygon including the aforesaid connecting portions, a draft member extending between the vehicles and having one portion connected to the second vehicle and another portion connected to the aforesaid first connecting portion, said draft member including a second side of said polygon, a third side of said polygon extending between the draft member and the aforesaid second connecting portion of the first vehicle and including a pair of relatively movable members, one connected to the second connecting portion on the trailer and the other connected to the draft member, and means for urging said movable members relatively to exert a force generally along said third side of the polygon to shift at least a part of one vehicle vertically with respect to the other for transferring at least part of the weight of the raised vehicle to the other vehicle.

23. A dirgible load-carrying vehicle comprising a frame, a steering gear connected with said frame and pivotable about an upwardly extending axis to guide the vehicle, a drawbar projecting outwardly from said frame and having a connection with the steering gear at a low elevation, said connection of the drawbar with the steering gear being constructed and arranged to transmit pivotal steering movement from the drawbar to the steering gear when the drawbar is swung horizontally relatively to the frame while facilitating swinging movement of the drawbar vertically realtively to said frame, an elongated thrust-exerting structure also projecting outwardly from said frame and having a universally pivotable connection therewith at a section above the connection of the drawbar with the steering gear, said elongated structure being swingable about its said connection to occupy a position in which it slopes downwardly at an angle to the drawbar and virtually within a vertical plane common thereto to place projected portions of the drawbar and of the elongated structure in juxtaposition, said elongated structure being forcibly distensible linearly, and means upon said projected portions of the drawbar and elongated structure for establishing an articulate connection therebetween for causing downward movement of said portions relatively to the vehicle body pursuant to said distension of the elongated structure.

24. In a hitch connection for use between a propelling vehicle and a propelled vehicle having a steering structure pivotable to guide such propelled vehicle, a drawbar disposed in a propelling force transmitting relation between the vehicles and at a low elevation with respect thereto, said drawbar having a portion remote from the propelled vehicle and a portion connected with the steering structure to impart pivotal steering movement thereto when the drawbar is swung horizontally, said connecting portion of the drawbar being constructed and arranged to facilitate vertical swinging of the drawbar with respect to the propelled vehicle, a thrust-exerting structure having a universally pivotable connection with the propelled vehicle at a higher elevation than said drawbar and thus arrangeable to slope downwardly from such connection to dispose a portion of said structure remote from the propelled vehicle in juxtaposition to said remote drawbar portion, and universal joint means for connecting said remote portions of the drawbar and of the thrust-exerting structure with the propelling vehicle to provide for turning of such vehicle relatively to said structure and drawbar, and said force-exerting structure being forcibly distensible, while the drawbar prevents separation of the vehicles, to cause the distended structure to impose a downward force from the propelled vehicle onto the propelling vehicle.

25. In combination; a vehicle; and a hitch structure comprising upper and lower members projecting endwise from the vehicle, said members being capable of transmitting thrust forces therethrough and being connected with the vehicle at respective vertically spaced positions for swinging both vertically and horizontally with respect to the vehicle, means upon at least one of said members for establishing an articulate connection between portions thereof remote from the vehicle for retaining said members in converging relation, and a fluid motor unit actuatable in one of said members for changing its length to forcibly change the elevation of the remote portions of said members with respect to the vehicle.

26. In combination; a load-carrying vehicle; and a hitch structure comprising upper and lower members projecting endwise from the vehicle, said members being capable of transmitting thrust forces therethrough and being connected with the vehicle at respective vertically spaced positions for swinging both vertically and horizontally with respect to the vehicle, means upon at least one of said members for establishing an articulate connection between respective portions of said members remote from the vehicle for retaining said members in converging relation, and a fluid motor unit actuatable in the upper of said members for increasing its length to forcibly lower the remote portions of said members with respect to the vehicle.

27. In combination; a dirigible load-carrying vehicle comprising a steering gear member movable to steer such vehicle; a hitch structure comprising upper and lower members projecting endwise from the vehicle and connected therewith at respective vertically spaced positions for swinging both vertically and horizontally with respect to the vehicle, means upon at least one of said members for establishing an articulate connection between portions thereof remote from the vehicle for retaining said members in converging relation, and a fluid motor unit actuatable in one of said members for changing its length to forcibly change the elevation of said remote portions of said members; and the connection of said hitch structure with the vehicle including a connection with said steering member to move the same when the hitch structure is swung horizontally.

28. In combination; a dirigible load-carrying vehicle comprising a steering gear member movable to steer such vehicle; a hitch structure comprising upper and lower members projecting endwise from the vehicle and connected therewith at respective vertically spaced positions for swinging both vertically and horizontally with respect to the vehicle, means upon at least one of said members for establishing an articulate connection between portions thereof remote from the vehicle for retaining said members in converging relation, and a fluid motor unit actuatable in the upper of said members for increasing its length to forcibly lower said remote portions of said members relatively to the vehicle; and the connection of said hitch structure with the vehicle including a connection with said steering member to move the same when the hitch structure is swung horizontally.

29. In combination; a vehicle; and a hitch structure comprising upper and lower members projecting endwise from the vehicle, said members being capable of transmitting thrust forces therethrough and being connected with the vehicle at respective vertically spaced positions for swinging both vertically and horizontally with respect to the vehicle, means upon at least one of said members for establishing an articulate connection between portions thereof remote from the vehicle for virtually restraining such remote portion of each member against movement endwise of the other member, and a fluid motor unit actuatable in one of said members for changing its length to forcibly change the relative elevation of the vehicle and said remote portions.

30. In combination; a dirigible load-carrying vehicle comprising a steering gear member movable to steer such vehicle; a hitch structure connected with the vehicle for both horizontal and vertical swinging movement with respect thereto and comprising upper and lower members projecting endwise from the vehicle, the connection of the hitch structure with the vehicle including connections of said upper and lower members with the vehicle at respective vertically spaced positions for swinging both vertically and horizontally with respect to the vehicle, means upon at least one of said members for establishing an articulate connection between portions thereof remote from the vehicle for restraining the remote portion of each member against movement endwise of the other member, and a fluid motor unit actuatable in one of said members for changing its length to forcibly change the relative elevation of the vehicle and said remote member portions; and the connection of said hitch structure with the vehicle including a connection with said steering member to impart steering movement to the same when the hitch structure is swung horizontally.

31. In a hitch connection for use between a propelling vehicle and a propelled vehicle having a steering structure pivotable to guide such propelled vehicle; the combination of a drawbar articulately connectable in a fore and aft directed relation between said steering structure and the propelling vehicle to transmit propelling force between the vehicles and to impart pivotal steering movement to the steering structure pursuant to a change in the course of the propelling vehicle, and a virtually laterally inflexible thrust-exerting structure articulately connectable with the propelled vehicle at an elevated position relatively to that at which the drawbar is connected therewith while extending downwardly at an angle to the drawbar toward the propelling vehicle to place an end of such thrust-exerting structure in downward force applying relation with the propelling vehicle, and said thrust-exerting structure being forcibly distensible, while the drawbar prevents separation of the vehicles, to cause the distended structure to impose a downward force from the propelled vehicle onto the propelling vehicle in an amount constituting a direct function of the distension.

32. The combination of: a draft vehicle; a drawn vehicle, having a main body and front and rear ground supports, the front support being swingable with respect to the main body for steering; a drawbar pivotally so universally articulately attached to the front of the drawn vehicle as to steeringly swing the front support thereof whenever the drawbar is swung laterally with respect to the drawn vehicle; a linearly compression element, capable of being forcibly expanded and virtually inflexible laterally; means for pivotally attaching this compression element to the drawn vehicle by a horizontal pivot, located a substantial distance above the point of attachment of the drawbar, and so that the compression element is capable of swinging about substantially the same vertical axis on the main body as the drawbar; universally articulate means for attaching the compression element and the drawbar to the draft vehicle and in such relative disposition that the compression element slopes downwardly substantially toward said articulate means and the drawbar; and means for forcibly expanding the compression element.

33. The combination of: a draft vehicle; a drawn vehicle, having a main body and front and rear ground supports, the front support being swingable for steering; a hitch structure universally articulately connected with and between the vehicles and comprising upper and lower members, capable of exerting thrust forces, projecting endwise between said vehicles, said upper and lower members being connected to one of the vehicles at respective vertically spaced positions for swinging both horizontally and vertically with respect to such vehicle, means upon at least one of said members for establishing an articulate connection between portions of said members remote from the one vehicle for retaining said members in converging relation; a hydraulic unit actuatable in one of said members for changing its length to forcibly change the elevation of said remote member portions incident to transmitting a vertical force component, through said hitch structure, between the vehicles; and the connection of said hitch structure with the drawn vehicle including an attachment in such manner as to steeringly swing the front support of the drawn vehicle whenever said members are swung laterally with respect to the drawn vehicle.

34. In combination, a propelling vehicle, a draft member pivotally connected to said vehicle for both horizontal and vertical swinging movement with respect thereto, a drawn vehicle having front and rear ground supports, means mounting the front ground support on the drawn vehicle for steering movement about an upwardly directed axis, means connecting the draft member to said front ground support for steering the same when said member is swung horizontally and for facilitating swinging movement of the draft member vertically with respect to the drawn vehicle, anchorage means on the drawn vehicle above the front ground support and substantially coincident with said axis, and a forcibly elongatable structure universally pivotably connected with said anchorage means and reaching toward and universally pivotably connected with the propelling vehicle for cooperation with the draft member in imposing weight from the front of the drawn vehicle onto the propelling vehicle pursuant to elongation of said structure.

LOVEL REYNOLDS SIMMONS.